(12) United States Patent
Syu et al.

(10) Patent No.: US 8,976,233 B2
(45) Date of Patent: Mar. 10, 2015

(54) THREE-DIMENSIONAL IMAGE PROCESSING METHOD AND THREE-DIMENSIONAL IMAGE PROCESSING CIRCUIT USING THE SAME METHOD

(75) Inventors: Shen-Sian Syu, Hsin-Chu (TW); Hung-Wei Tseng, Hsin-Chu (TW); Chun-Huai Li, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 508 days.

(21) Appl. No.: 13/347,864

(22) Filed: Jan. 11, 2012

(65) Prior Publication Data

US 2012/0281074 A1 Nov. 8, 2012

(30) Foreign Application Priority Data

May 3, 2011 (TW) .............. 100115516 A

(51) Int. Cl.
*H04N 13/04* (2006.01)
*H04N 13/00* (2006.01)

(52) U.S. Cl.
CPC ....... *H04N 13/0007* (2013.01); *H04N 13/0037* (2013.01); *H04N 13/0422* (2013.01)
USPC .......................................... 348/51

(58) Field of Classification Search
CPC .................................................. G02B 27/2214
See application file for complete search history.

(56) References Cited

U.S. PATENT DOCUMENTS

| 2002/0114077 A1 | 8/2002 | Javidi |
| 2003/0052836 A1* | 3/2003 | Matsumoto et al. .............. 345/6 |
| 2005/0244050 A1 | 11/2005 | Nomura et al. |
| 2007/0008314 A1 | 1/2007 | Song et al. |
| 2007/0159476 A1 | 7/2007 | Grasnick |
| 2008/0079804 A1 | 4/2008 | Hamagishi et al. |
| 2009/0002262 A1 | 1/2009 | Fukushima et al. |
| 2009/0045326 A1* | 2/2009 | Sato et al. .................. 250/216 |
| 2011/0063419 A1 | 3/2011 | Lee et al. |
| 2011/0169831 A1* | 7/2011 | Kao et al. .................. 345/426 |

FOREIGN PATENT DOCUMENTS

| CN | 1892808 | 1/2007 |
| CN | 101150741 | 3/2008 |
| CN | 101153961 | 4/2008 |
| CN | 101653012 | 2/2010 |
| EP | 2285133 | 2/2011 |
| JP | 2009124719 | 6/2009 |
| WO | 2005029871 | 3/2005 |

* cited by examiner

*Primary Examiner* — Huy T Nguyen

(74) *Attorney, Agent, or Firm* — WPAT, PC; Justin King

(57) ABSTRACT

A three-dimensional image processing method and a three-dimensional image processing circuit using the above method are provided. The method is configured for processing N source images, and N is a natural number and is larger than or equal to two. Each of the source images corresponds to a visual angle, and each of the source images comprises image data with three primary colors. The image data of each of the source images are arranged in an array according to a predetermined color sequence. In the method, six parameters are provided firstly, wherein each of the six parameters is configured for defining a basic data-arrangement variation. Then, the image data with three primary colors of the N source image are obtained according to the six parameters, so as to form a three-dimensional image.

10 Claims, 21 Drawing Sheets

(A)

↓

| providing a fourth parameter configured for setting whether the image data which will be disposed in the same column of the three-dimensional image should be obtained from the same source image; if not, the fourth parameter being also configured for setting how many columns that a specific image data in a second specified row in the three-dimensional image should be shifted from the first column of the array in a predetermined direction, and in the second specified row the specific image data being the first data obtained from the image source where the image data in the first column in a first specified row in the three-dimensional image belongs to; the first specified row being a data row in which the image data are processed or have been just processed, and the second specified row being a data row after the first specified row | ~S208 |

↓ providing a fifth parameter configured for presenting a setting result of the fourth parameter, and the fifth parameter being further configured for setting how many rows that the first specified row should be shifted in a vertical direction to reach the second specified row when the fourth parameter sets that the image data which will be disposed in the same column do not need to be obtained from the same source image   ~S210

↓ providing a sixth parameter configured for setting whether the image data of three-dimensional primary colors belonging to the same pixel in the same source image should be distributed in three adjacent rows and in three adjacent columns of the three-dimensional image   ~S212

Pixel / Sub-Pixel:Pixel
Views:2
Start View:1
Shift:0
Interval:0
Multi Shift:0

Pixel / Sub-Pixel:Pixel
Views:2
Start View:2
Shift:0
Interval:0
Multi Shift:0

FIG. 13

Pixel / Sub-Pixel:Pixel
Views:2
Start View:1
Shift:3
Interval:1
Multi Shift:0

FIG. 14

Pixel / Sub-Pixel:Pixel
Views:2
Start View:2
Shift:3
Interval:1
Multi Shift:0

FIG. 15

Pixel / Sub-Pixel:Sub-Pixel
Views:2
Start View:1
Shift:0
Interval:0
Multi Shift:0

FIG. 16

Pixel / Sub-Pixel:Sub-Pixel
Views:2
Start View:2
Shift:0
Interval:0
Multi Shift:0

FIG. 17

Pixel / Sub-Pixel:Sub-Pixel
Views:2
Start View:1
Shift:1
Interval:1
Multi Shift:0

FIG. 18

Pixel / Sub-Pixel:Sub-Pixel
Views:2
Start View:2
Shift:1
Interval:1
Multi Shift:0

FIG. 19

| 1 | 2 | 3 | 4 | 5 | 1 | 2 | 3 | 4 | 5 | 1 | 2 |
|---|---|---|---|---|---|---|---|---|---|---|---|
| 5 | 1 | 2 | 3 | 4 | 5 | 1 | 2 | 3 | 4 | 5 | 1 |
| 4 | 5 | 1 | 2 | 3 | 4 | 5 | 1 | 2 | 3 | 4 | 5 |
| 3 | 4 | 5 | 1 | 2 | 3 | 4 | 5 | 1 | 2 | 3 | 4 |
| 2 | 3 | 4 | 5 | 1 | 2 | 3 | 4 | 5 | 1 | 2 | 3 |
| 1 | 2 | 3 | 4 | 5 | 1 | 2 | 3 | 4 | 5 | 1 | 2 |
| 5 | 1 | 2 | 3 | 4 | 5 | 1 | 2 | 3 | 4 | 5 | 1 |
| 1 | 5 | 1 | 2 | 3 | 4 | 5 | 1 | 2 | 3 | 4 | 5 |

Pixel / Sub-Pixel:Sub-Pixel
Views:5
Start View:1
Shift:1
Interval:1
Multi Shift:1

FIG. 20

Pixel / Sub-Pixel:Sub-Pixel
Views:5
Start View:1
Shift:0
Interval:0
Multi Shift:0 defining a data-arrangement sub-array for a three-dimensional image, wherein each of the elements of the data-arrangement sub-array is configured for indicating that the image data with one primary color should be obtained from which one of the N source images, a data-arrangement array presented by the three-dimensional image can be divided into a plurality of data-arrangement sub-arrays which do not overlap with each other, the image data corresponding to the elements of the data-arrangement sub-array are arranged according to the predetermined color sequence, and the image sources indicated by the elements of the data-arrangement sub-array comprise the N source images ~ S2302 obtaining the image data with the three primary colors of the N source images according to the data-arrangement sub-array, so as to form the three-dimensional image ~ S2304

THREE-DIMENSIONAL IMAGE PROCESSING METHOD AND THREE-DIMENSIONAL IMAGE PROCESSING CIRCUIT USING THE SAME METHOD

TECHNICAL FIELD

The present invention relates to the three-dimensional image technology, and more particularly to a three-dimensional image processing method and a three-dimensional image processing circuit using the same method.

BACKGROUND

FIG. 1 is a schematic view of a conventional three-dimensional image processing circuit applied to a three-dimensional television. Referring to FIG. 1, the three-dimensional image processing circuit comprises a data-sequence converter 110 and a timing controller 120. The data-sequence converter 110 is configured for receiving image data (as marked by label Din) of a plurality of source images. In these source images, each of the source images corresponds to a visual angle, and each of the source images comprises image data with three primary colors. The image data of each of the source images are arranged in an array according to a predetermined color sequence. After receiving the image data of the source images, the data-sequence converter 110 re-sequences the received image data according to the hardware standard of the three-dimensional television, so as to perform a synthesizing process on the source images to form a data sequence (as marked by label Dout) of a three-dimensional image corresponding to the hardware standard mentioned above. The timing controller 120 is configured for receiving the data sequence of the three-dimensional image to perform a further process and generating a corresponding control signal (as marked by label CS) to control back-end circuits, so that the three-dimensional television can display a three-dimensional image.

In the conventional three-dimensional television, the timing controller 120 and the back-end circuits are generally manufactured by panel manufacturers, and the data-sequence converter 110 is generally manufactured by IC (integrated circuit) manufacturers. Since the hardware standard of the three-dimensional television may be designed by employing different technologies such as the barrier technology, the lenticular lens technology or the polarizer technology, the IC manufacturers for manufacturing the data-sequence converter 110 should design the data-sequence converter 110 according to the hardware standard of the three-dimensional television, so that the data-sequence converter 110 is able to generate the data sequence of the three-dimensional image corresponding to the hardware standard of the three-dimensional television. However, sometimes the panel manufactures may slightly alter the hardware design of the three-dimensional television for the optical factor, so that the hardware standard of the three-dimensional television is unique. Thus, the IC manufacturers for manufacturing the data-sequence converter 110 may not produce the corresponding data-sequence converter 110 in time because of the cost factor or the essential designing time. Therefore, even if the panel manufacturers produce a three-dimensional television with a good hardware design, there may still be no corresponding image data of three-dimensional images for displaying.

SUMMARY

The present invention relates to a three-dimensional image processing method, which only employs six parameters to perform a synthesizing process on N source images, so as to form a data sequence of a three-dimensional image corresponding to the hardware standard of a three-dimensional television. Wherein, N is a natural number and is larger than or equal to two.

The present invention also relates to a three-dimensional image processing circuit using the above three-dimensional image processing method which only employs six parameters.

The present invention further relates to a three-dimensional image processing method, which only employs a data-arrangement sub-array to perform a synthesizing process on N source images, so as to form a data sequence of a three-dimensional image corresponding to the hardware standard of a three-dimensional television. Wherein, N is a natural number and is larger than or equal to two.

The present invention further relates to a three-dimensional image processing circuit using the above three-dimensional image processing method which only employs a data-arrangement sub-array.

The present invention provides a three-dimensional image processing method configured for processing N source images. Each of the source images corresponds to a visual angle, and each of the source images comprises image data with three primary colors. The image data of each of the source images are arranged in an array according to a predetermined color sequence, and N is a natural number and is larger than or equal to two. The three-dimensional image processing method comprises the steps of providing a first parameter configured for setting whether one of the pixels of a three-dimensional image which should be viewed by a user is formed by adjacent image data with the three primary colors of the three-dimensional image, wherein the image data of the three-dimensional image are arranged in an array according to the predetermined color sequence; providing a second parameter, which is set to N; providing a third parameter configured for setting the image data which will be disposed at the position where the first row and the first column of the three-dimensional image intersect should be obtained from which one of the N source images; providing a fourth parameter configured for setting whether image data which will be disposed in the same column of the three-dimensional image should be obtained from the same source image, wherein if not, the fourth parameter is also configured for setting how many columns that a specific image data in a second specified row in the three-dimensional image should be shifted from the first column of the array in a predetermined direction, and in the second specified row the specific image data being the first data obtained from the image source where the image data in the first column in a first specified row in the three-dimensional image belongs to, the first specified row is a data row in which the image data are processed or have been just processed, and the second specified row is a data row after the first specified row; providing a fifth parameter configured for presenting a setting result of the fourth parameter, wherein the fifth parameter is also configured for setting how many rows that the first specified row should be shifted in a vertical direction to reach the second specified row when the fourth parameter sets that the image data which will be disposed in the same column do not need to be not obtained from the same source image; providing a sixth parameter configured for setting whether the image data of three-dimensional primary colors belonging to the same pixel in the same source image should be distributed in three adjacent rows and in three adjacent columns of the three-dimensional image; and obtaining the image data with the three primary colors of the N source images according to the first parameter, the second parameter, the third parameter, the fourth parameter, the fifth parameter and the sixth parameter, so as to form the three-dimensional image.

The present invention also provides a three-dimensional image processing circuit configured for processing N source images. Each of the source images corresponds to a visual angle, and each of the source images comprises image data with three primary colors. The image data of each of the source images are arranged in an array according to a predetermined color sequence, and N is a natural number and is larger than or equal to two. The three-dimensional image processing circuit comprises a controller, a memory unit and a timing controller. The controller is configured for receiving image data of the N source images, a first parameter, a second parameter, a third parameter, a fourth parameter, a fifth parameter and a sixth parameter, and obtaining the image data with the three primary colors of the N source images according to the first parameter, the second parameter, the third parameter, the fourth parameter, the fifth parameter and the sixth parameter, so as to form a data sequence of a three-dimensional image. The first parameter is configured for setting whether one of the pixels of the three-dimensional image which should be viewed by a user is formed by adjacent image data with the three primary colors of the three-dimensional image. The image data of the three-dimensional image are arranged in an array according to the predetermined color sequence. The second parameter is set to N. The third parameter is configured for setting the image data which will be disposed at the position where the first row and the first column of the three-dimensional image intersect should be obtained from which one of the N source images. The fourth parameter is configured for setting whether the image data which will be disposed in the same column of the three-dimensional image should be obtained from the same source image. If not, the fourth parameter is also configured for setting how many columns that a specific image data in a second specified row in the three-dimensional image should be shifted from the first column of the array in a predetermined direction, and in the second specified row the specific image data is the first data obtained from the image source where the image data in the first column in a first specified row in the three-dimensional image belongs to. The first specified row is a data row in which the image data are processed or have been just processed, and the second specified row is a data row after the first specified row. The fifth parameter is configured for presenting the setting result of the fourth parameter. Furthermore, the fifth parameter is also configured for setting how many rows that the first specified row should be shifted in a vertical direction to reach the second specified row when the fourth parameter sets that the image data which will be disposed in the same column do not need to be obtained from the same source image. The sixth parameter is configured for setting whether the image data of three-dimensional primary colors belonging to the same pixel in the same source image should be distributed in three adjacent rows and in three adjacent columns of the three-dimensional image. The memory unit is electrically coupled to the controller for storing the output of the controller. The timing controller is electrically coupled to the memory unit for accessing the memory unit and processing the data stored in the memory unit.

The present invention further provides a three-dimensional image processing method configured for processing N source images. Each of the source images corresponds to a visual angle, and each of the source images comprises image data with three primary colors. The image data of each of the source images are arranged in an array according to a predetermined color sequence, and N is a natural number and is larger than or equal to two. The three-dimensional image processing method comprises the steps of defining a data-arrangement sub-array for a three-dimensional image, wherein each of the elements of the data-arrangement sub-array is configured for indicating that the image data with one primary color should be obtained from which one of the N source images, a data-arrangement array presented by the three-dimensional image can be divided into a plurality of data-arrangement sub-arrays which do not overlap with each other, the image data corresponding to the elements of the data-arrangement sub-array are arranged according to the predetermined color sequence, and the image sources indicated by the elements of the data-arrangement sub-array comprise the N source images; and obtaining the image data with the three primary colors of the N source images according to the data-arrangement sub-array, so as to form the three-dimensional image.

The present invention further provides a three-dimensional image processing circuit configured for processing N source images. Each of the source images corresponds to a visual angle, and each of the source images comprises image data with three primary colors. The image data of each of the source images are arranged in an array according to a predetermined color sequence, and N is a natural number and is larger than or equal to two. The three-dimensional image processing circuit comprises a controller, a memory unit and a timing controller. The controller is configured for receiving the image data of the N source images and the information of a data-arrangement sub-array of a three-dimensional image and for obtaining the image data with the three primary colors of the N source images according to the data-arrangement sub-array, so as to form a data sequence of the three-dimensional image to output. Each of the elements of the data-arrangement sub-array is configured for indicating that the image data with one primary color should be obtained from which one of the N source images. A data-arrangement array presented by the three-dimensional image can be divided into a plurality of data-arrangement sub-arrays which do not overlap with each other. The image data corresponding to the elements of the data-arrangement sub-array are arranged according to the predetermined color sequence, and the image sources indicated by the elements of the data-arrangement sub-array comprise the N source images. The memory unit is electrically coupled to the controller for storing the output of the controller. The timing controller is electrically coupled to the memory unit for accessing the memory unit and processing the data stored in the memory unit.

In one method of the present invention for solving the above problem, six parameters are firstly provided, wherein each of the six parameters is configured for defining a basic data-arrangement variation, and then the image data with three primary colors of the N source images are obtained according to the six parameters, so as to form a three-dimensional image. Therefore, the present invention may only employ the six parameters to perform the synthesizing process on the N source images, so as to form the data sequence of the three-dimensional image corresponding to the hardware standard of the three-dimensional television. In addition, in another method of the present invention for solving the above problem, a data-arrangement sub-array of a three-dimensional image is firstly defined. Wherein each of the elements of the data-arrangement sub-array is configured for indicating that the image data with one primary color should be obtained from which one of the N source images. A data-arrangement array presented by the three-dimensional image can be divided into a plurality of data-arrangement sub-arrays which do not overlap with each other. Then, the image data with the three primary colors of the N source images are obtained according to the data-arrangement sub-array, so as to form the three-dimensional image. Therefore, the present invention may only employ one data-arrangement sub-array to perform the synthesizing process on the N source image, so as to form a data sequence of the three-dimensional image corresponding to the hardware standard of the three-dimensional television.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 2A-2D show a flow chart of a three-dimensional image processing method in accordance with an exemplary embodiment of the present invention.

FIG. 7 is a schematic view for showing an arrangement mode for the image data of a three-dimensional image adapted into the three-dimensional display panel as shown in FIG. 6.

FIG. 13 is a schematic view for showing an arrangement mode of the image data of a three-dimensional image in accordance with a second exemplary embodiment of the present invention.

FIG. 14 is a schematic view for showing an arrangement mode of the image data of a three-dimensional image in accordance with a third exemplary embodiment of the present invention.

FIG. 15 is a schematic view for showing an arrangement mode of the image data of a three-dimensional image in accordance with a fourth exemplary embodiment of the present invention.

FIG. 16 is a schematic view for showing an arrangement mode of the image data of a three-dimensional image in accordance with a fifth exemplary embodiment of the present invention.

FIG. 17 is a schematic view for showing an arrangement mode of the image data of a three-dimensional image in accordance with a sixth exemplary embodiment of the present invention.

FIG. 18 is a schematic view for showing an arrangement mode of the image data of a three-dimensional image in accordance with a seventh exemplary embodiment of the present invention.

FIG. 19 is a schematic view for showing an arrangement mode of the image data of a three-dimensional image in accordance with an eighth exemplary embodiment of the present invention.

FIG. 20 is a schematic view for showing an arrangement mode of the image data of a three-dimensional image in accordance with a ninth exemplary embodiment of the present invention.

FIG. 23 is a flow chart of a three-dimensional image processing method in accordance with another exemplary embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
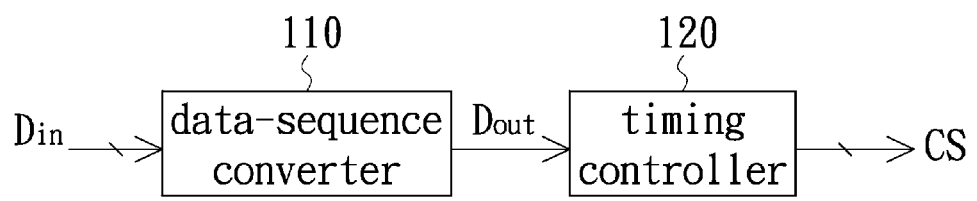
FIG. 1 is a schematic view of a conventional three-dimensional image processing circuit applied to a three-dimensional television.
Figure 2A:
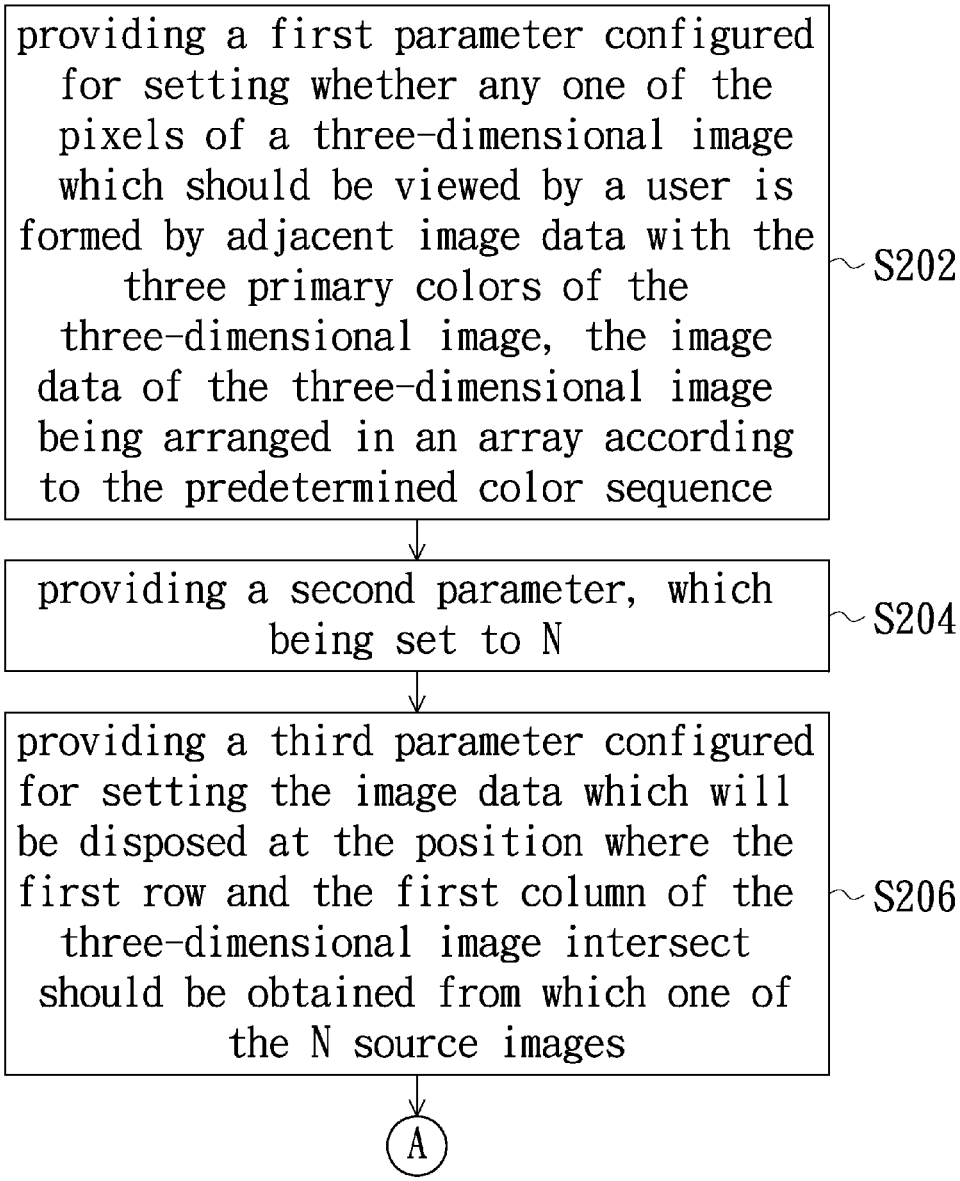
Figure 2D:
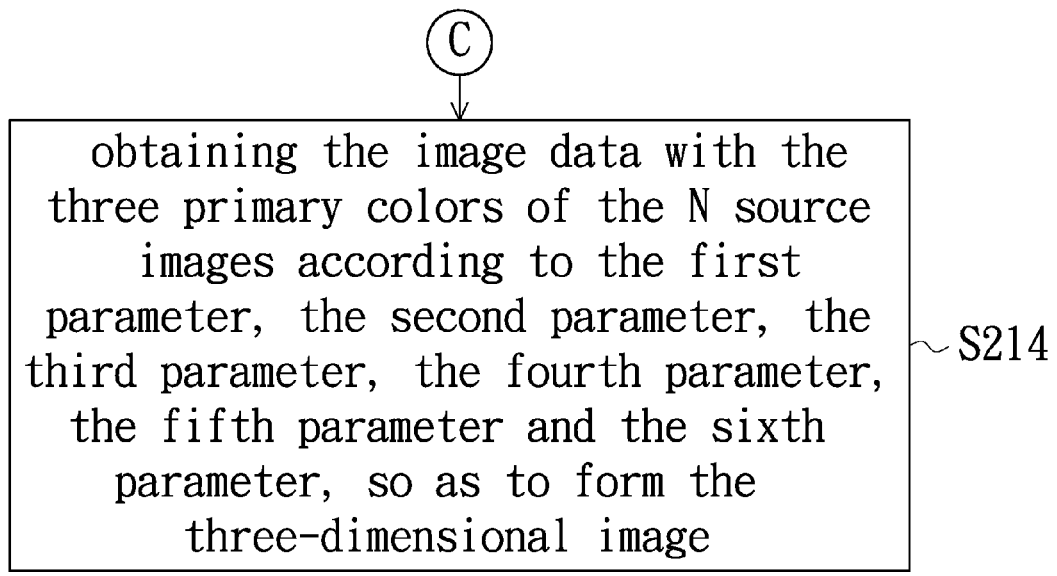
Figure 3:
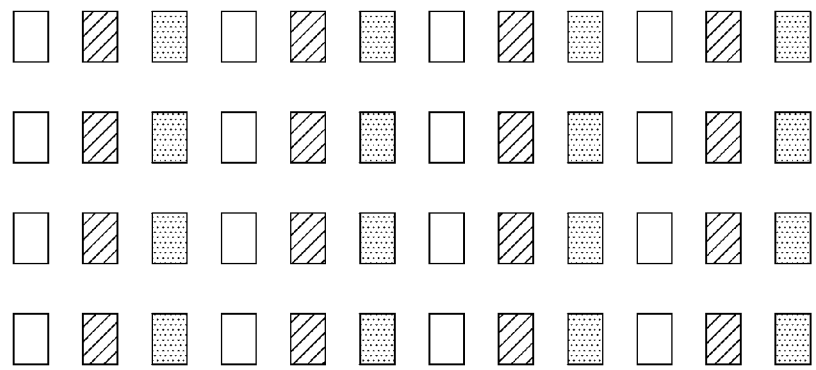
FIG. 3 is a schematic view for showing an example of the source images.

FIGS. 2A-2D show a flow chart of a three-dimensional image processing method in accordance with an exemplary embodiment of the present invention. The three-dimensional image processing method is configured for processing N source images, and N is a natural number and is larger than or equal to two 2. In the exemplary embodiment, the source images have the same image size, and each of the source images corresponds to a visual angle. FIG. 3 is a schematic view for showing an example of the source images. In FIG. 3, the blank cells represent red image data, the cells with diagonal lines represent green image data, and the cells with dots represent blue image data. As shown in FIG. 3, each of the source images comprises image data with three primary colors. Furthermore, the image data of each of the image sources are arranged in an array according to a predetermined color sequence.

Referring to FIGS. 2A-2D, in the three-dimensional processing method a first parameter is firstly provided. The first parameter is configured for setting whether one of the pixels of a three-dimensional image which should be viewed by a user is formed by adjacent image data with three primary colors of the three-dimensional image, wherein the image data of the three-dimensional image are also arranged in an array according to the predetermined color sequence (as shown in Step S202). The following will employ a three-dimensional image presented by a three-dimensional television using the barrier technology as an example to describe the application of the first parameter.

Figure 4:
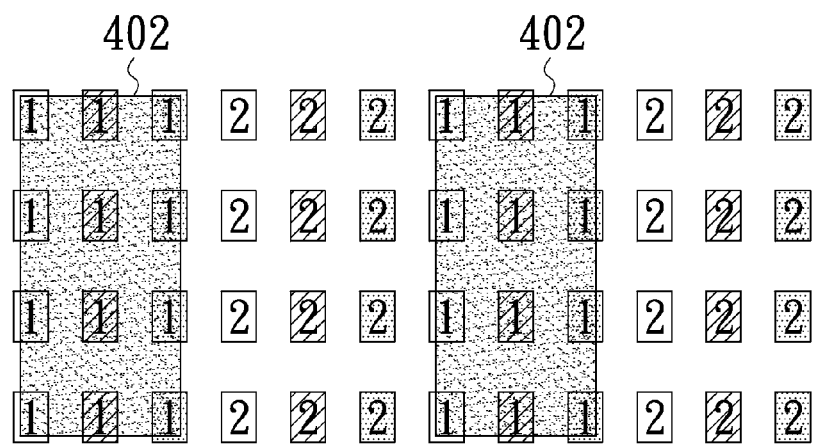
FIG. 4 is a schematic view for showing an example of a three-dimensional image presented by a three-dimensional television using a barrier technology.
Figure 5:
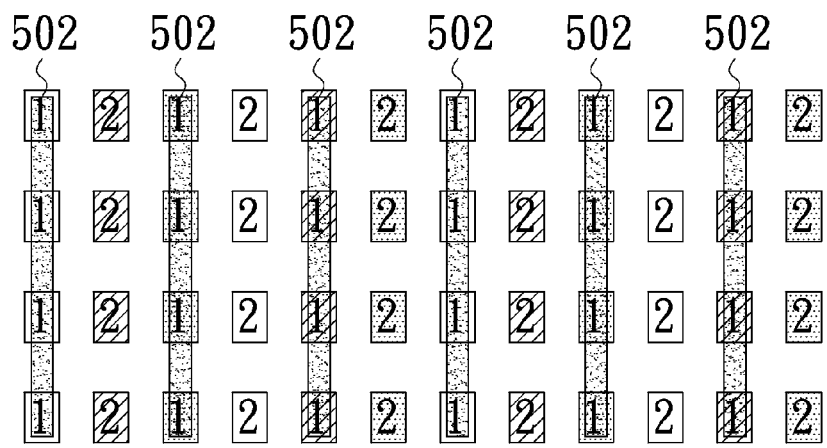
FIG. 5 is a schematic view for showing another example of a three-dimensional image presented by the three-dimensional television using another barrier technology.

FIG. 4 is a schematic view for showing an example of a three-dimensional image presented by a three-dimensional television using a barrier technology, and FIG. 5 is a schematic view for showing another example of a three-dimensional image presented by the three-dimensional television using another barrier technology. Referring to FIGS. 4 and 5, the image data of each three-dimensional image are also arranged in an array according to the predetermined color sequence, and each three-dimensional image comprises the image data of two source images. In FIGS. 4 and 5, the image data denoted by label 1 are obtained from the source image 1, and the image data denoted by label 2 are obtained from the source image 2. In FIG. 4, a barrier 402 is used to shade the image data obtained from the same source image (such as the source image 1) by shading a pixel as a shaded unit. The image data which are not shaded are obtained from the other source image (such as the source image 2). As shown in FIG. 4, one of the pixels of the three-dimensional image which is viewed by the user is formed by adjacent image data with three primary colors of the three-dimensional image. In FIG. 5, a barrier 502 is used to shade the image data obtained from the same source image (such as the source image 1) by shading a sub-pixel as a shaded unit. The image data which are not shaded are obtained from the other source image (such as the source image 2). As shown in FIG. 5, one of the pixels of the three-dimensional image which is viewed by the user is not formed by adjacent image data with three primary colors of the three-dimensional image.

Therefore, the first parameter can be configured for defining a basic data-arrangement variation, so that the image data obtained from different source images can be arranged according to the forming mode of one of the pixels of the three-dimensional image which should be viewed by eyes of the user.

Figure 6:
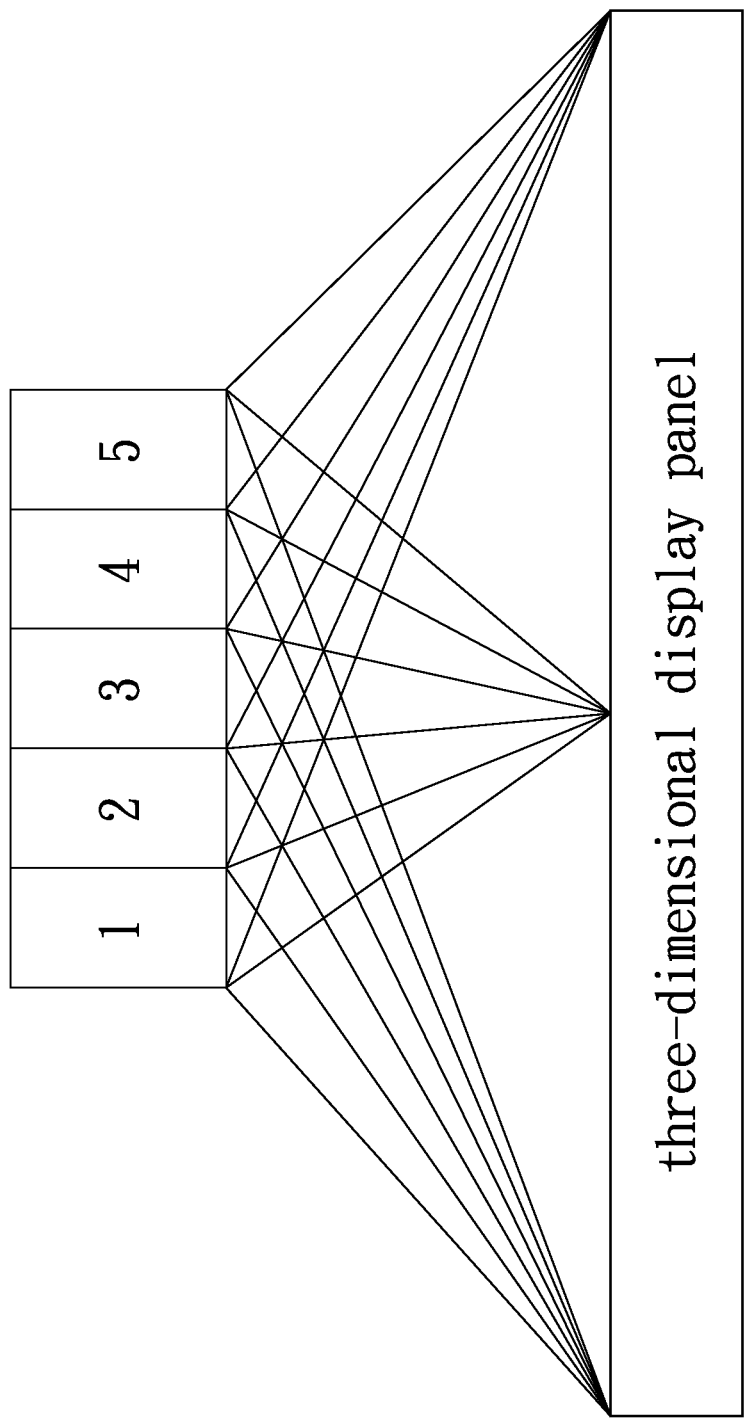
FIG. 6 is a schematic view of a three-dimensional display panel corresponding to five visual angles (that is, N is five).
Figure 7:
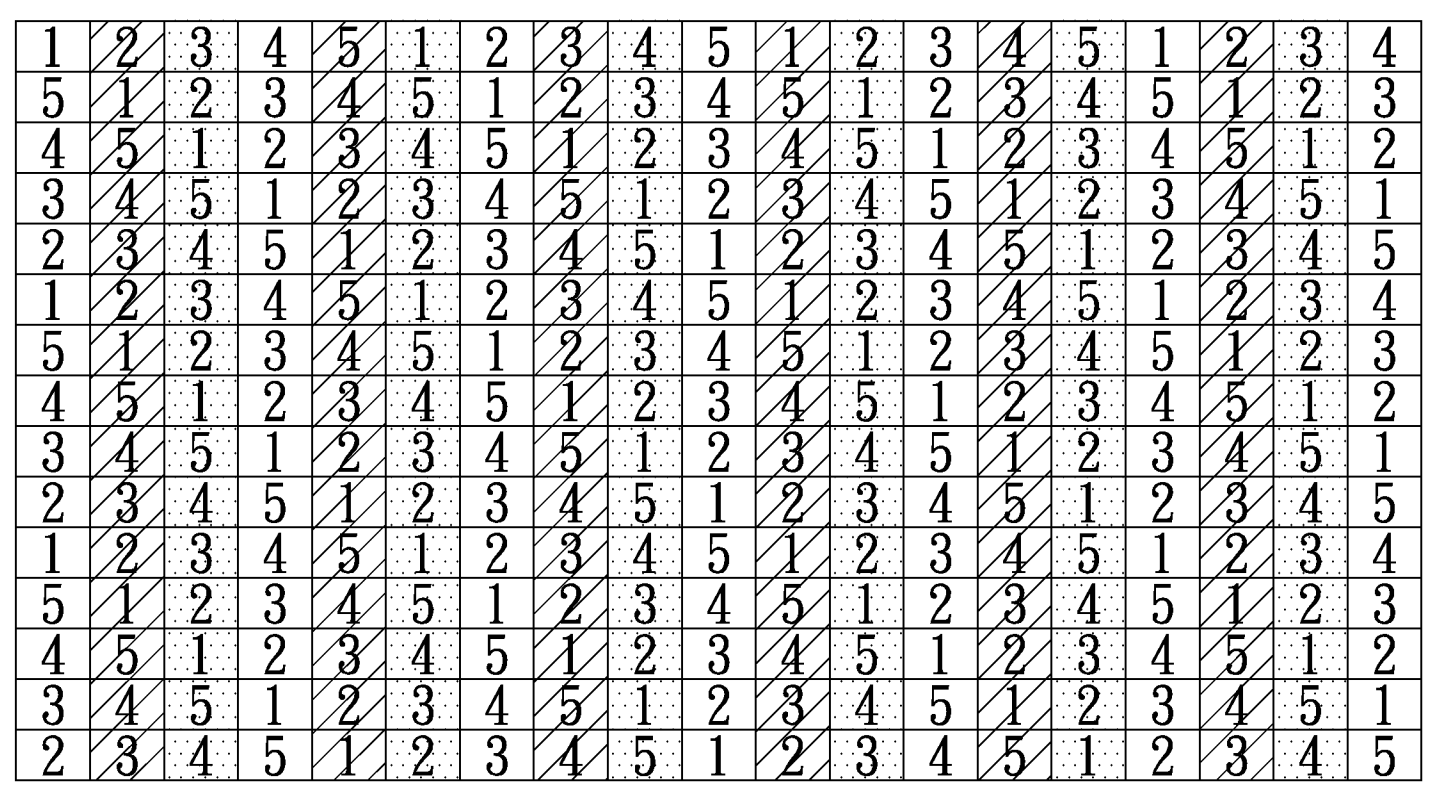

After Step S202 has been performed, a second parameter is provided. The second parameter is set to N (as shown in Step S204). The following will employ an example as shown in FIGS. 6 and 7 to describe the application of the second parameter. FIG. 6 is a schematic view of a three-dimensional display panel corresponding to five visual angles (that is, N is five), and FIG. 7 is a schematic view for showing an arrangement mode of the image data of a three-dimensional image displayed on the three-dimensional display panel as shown in FIG. 6. In FIG. 7, the image data denoted by label 1 are obtained from the source image 1, the image data denoted by label 2 are obtained from the source image 2, and the other image data denoted by other labels are labeled by a similar way. As shown in FIG. 7, the three-dimensional image comprises the image data of the five source images. Therefore, the second parameter can be configured for defining another basic data-arrangement variation, so that the image data obtained from different source images can be arranged according to the number defined by the second parameter.

Figure 8:
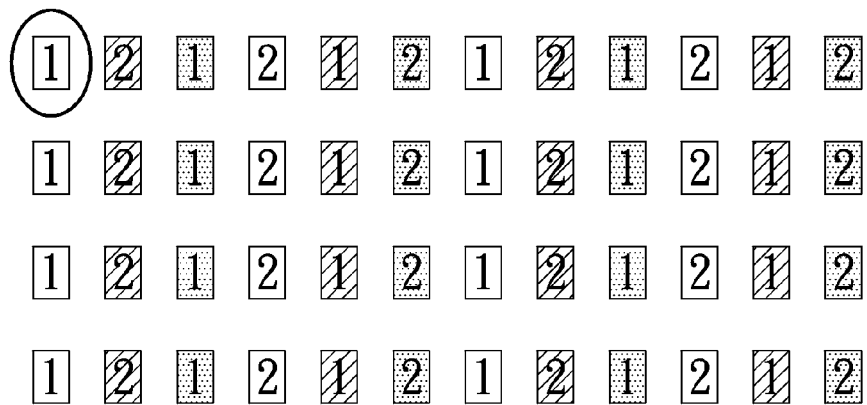
FIG. 8 is a schematic view for showing an arrangement mode of the image data of a three-dimensional image
Figure 9:
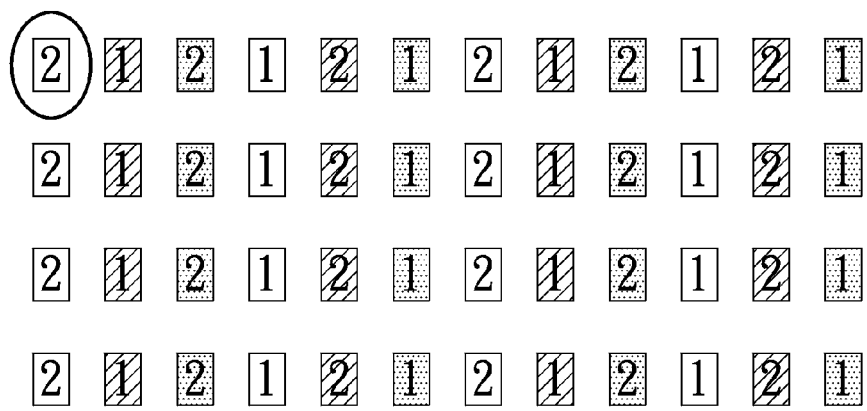
FIG. 9 is a schematic view for showing another arrangement mode of the image data of a three-dimensional image.

After Step S204 had been performed, a third parameter is provided. The third parameter is configured for setting the image data which will be disposed at the position where the first row and the first column of the three-dimensional image intersect should be obtained from which one of the source images (as shown in Step S206). The following will employ examples as shown in FIGS. 8 and 9 to describe the application of the third parameter. FIG. 8 is a schematic view for showing an arrangement mode of the image data of a three-dimensional image, and FIG. 9 is a schematic view for showing another arrangement mode of the image data of a three-dimensional image. In FIGS. 8 and 9, the image data denoted by label 1 are obtained from the source image 1, and the image data denoted by label 2 are obtained from the source image 2. As shown in FIG. 8, the image data disposed at the position where the first row and the first column of the three-dimensional image intersect is obtained from the source image 1. That is, a first image data of the three-dimensional image is obtained from the source image 1. As shown in FIG. 9, the image data disposed at the position where the first row and the first column of the three-dimensional image intersect is obtained from the source image 2. That is, a first image data of the three-dimensional image is obtained from the source image 2. Therefore, the third parameter can be configured for defining still another basic data-arrangement variation, so that the image data obtained from different source images can be arranged according to the third parameter.

After Step S206 has been performed, a fourth parameter is provided. The fourth parameter is configured for setting whether the image data which will be disposed in the same column of the three-dimensional image should be obtained from the same source image. If not, the fourth parameter is also configured for setting how many columns that a specific image data in a second specified row in the three-dimensional image should be shifted from the first column of the array in a predetermined direction, and in the second specified row the specific image data being the first data obtained from the image source where the image data in the first column in a first specified row in the three-dimensional image belongs to, wherein the first specified row is a data row in which the image data are processed or have been just processed, and the second specified row is a data row after the first specified row (as shown in Step S208). The following will employ an example as shown in FIG. 10 to describe the application of the fourth parameter.

Figure 10:
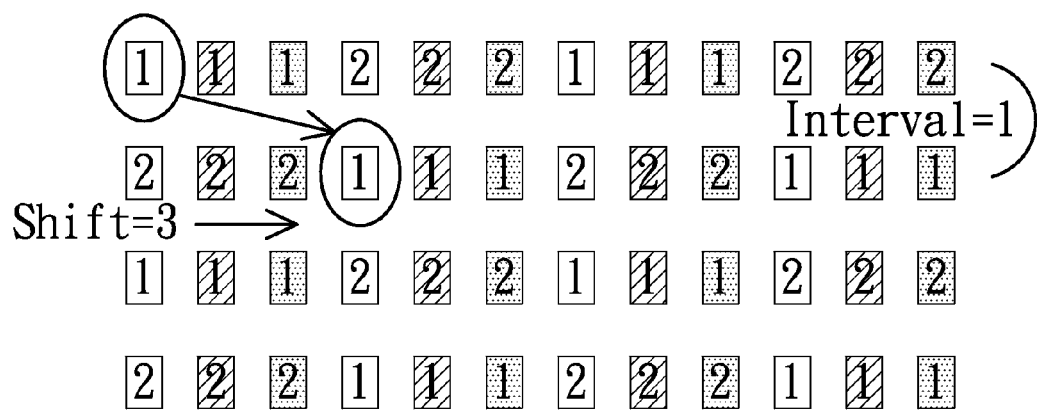
FIG. 10 is a schematic view for showing an arrangement mode of the image data of a three-dimensional image.

FIG. 10 is a schematic view for showing an arrangement mode of the image data of a three-dimensional image. In FIG. 10, the image data denoted by label 1 are obtained from the source image 1, the image data denoted by label 2 are obtained from the source image 2, the label "Shift" is configured for representing the fourth parameter, and the label "Interval" is configured for representing a fifth parameter (which will be described later). It should be noted that the fourth parameter and the fifth parameter in FIG. 10 present their setting values by numbers, but the present invention is not limited herein. As shown in FIG. 10, in the three-dimensional image, the image data disposed in the same column are not obtained from the same source image, thus the fourth parameter can be set to a setting value larger than zero. On the contrary, if the image data disposed in the same column are obtained from the same source image, the fourth parameter can be set to zero.

The following will describe a mode for setting the setting value of the fourth parameter Shift. Referring to FIG. 10, in the three-dimensional image as shown in FIG. 10, since the image data disposed in the same column are not obtained from the same source image, and the three-dimensional image is obtained by performing the image synthesizing operation row-by-row, the fourth parameter Shift as shown in FIG. 10 is also configured for setting how many columns that a specific image data in a second specified row in the three-dimensional image should be shifted from the first column of the array in a predetermined direction, wherein in the second specified row the specific image data is the first data obtained from the image source where the image data in the first column in a first specified row in the three-dimensional image belongs to. The first specified row is a data row in which the image data are processed or have been just processed, and the second specified row is a data row after the first specified row. The fifth parameter Interval is configured for setting a distance between the second specified row and the first specified row (which will be described later).

From the above description, in the arrangement mode of the image data of the three-dimensional image as shown in FIG. 10, if the first row of the three-dimensional image as shown in FIG. 10 is the data row in which the image data are processed or have been just processed, the first row of the three-dimensional image is the first specified row. Since the setting value of the fifth parameter Interval is set to 1, the second row of the three-dimensional image is the second specified row at this moment. Similarly, if the second row of the three-dimensional image as shown in FIG. 10 is the data row in which the image data are processed or have been just processed, the second row of the three-dimensional image is the first specified row at this moment. Since the setting value of the fifth parameter Interval is set to 1, the third row of the three-dimensional image is the second specified row at this moment. In the example as shown in FIG. 10, the predetermined direction is defined from left to right. From FIG. 10, it can be seen that the specific image data in a second specified row in the three-dimensional image should be shifted from the first column by three columns in right direction, wherein in the second specified row the specific image data is the first data obtained from the image source where the image data in the first column in a first specified row in the three-dimensional image belongs to. Therefore, the setting value of the fourth parameter Shift is set to 3.

From the above, it can be seen that the fourth parameter Shift can be configured for defining another basic data-arrangement variation, so that the image data obtained from different source images can be arranged according to the fourth parameter Shift. In addition, from the above description, it can be seen that when the fourth parameter Shift is set to a setting value larger than zero, the fifth parameter Interval should also be set to a setting value larger than zero. On the contrary, if the fourth parameter Shift is set to zero, the fifth parameter Interval should also be set to zero.

After Step S208 has been performed, a fifth parameter is provided. As described in the above, the fifth parameter is configured for presenting a setting result of the fourth parameter. Furthermore, when the fourth parameter sets that the image data in the same column are not obtained from the same source image, the fifth parameter is also configured for setting how many rows that the first specified row should be shifted in a vertical direction to reach the second specified row (as shown in Step S210). Therefore, the fifth parameter can be configured for defining another basic data-arrangement variation, so that the image data obtained from different source images can be arranged according to the fifth parameter.

After Step S210 has been performed, a sixth parameter is provided. The sixth parameter is configured for setting whether the image data of three primary colors belonging to the same pixel in the same source image should be distributed in three adjacent columns and in three adjacent rows of the three-dimensional image (as shown in Step S212). If the sixth parameter sets that the image data with three primary colors belonging to the same pixel in the same source image should not be distributed in three adjacent columns and in three adjacent rows of the three-dimensional image, the image data with the three primary colors belonging to the same pixel in the same source image may be disposed in three adjacent columns and in the same row as shown in FIG. 10. On the contrary, if the sixth parameter sets that the image data with three primary colors belonging to the same pixel in the same source image should be distributed in three adjacent columns and in three adjacent rows of the three-dimensional image, the image data with the three primary colors belonging to the same pixel in the same source image may be disposed as shown in FIG. 11.

Figure 11:
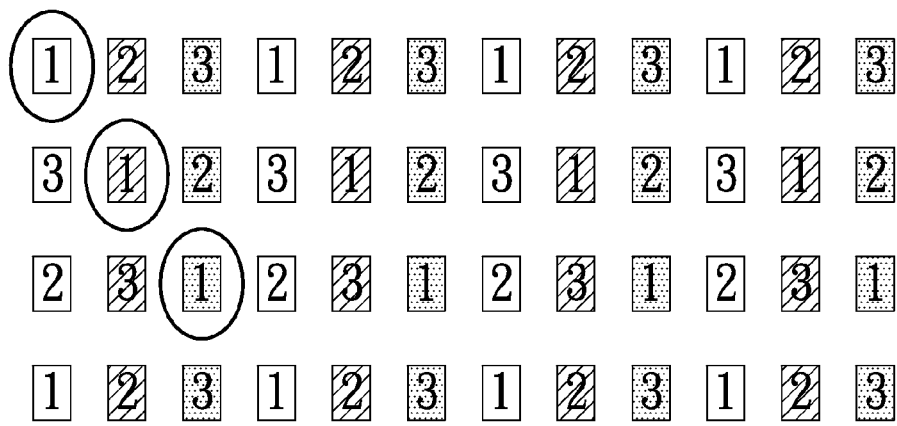
FIG. 11 is a schematic view for showing an arrangement mode of the image data of a three-dimensional image.

FIG. 11 is a schematic view for showing an arrangement mode of the image data of a three-dimensional image. In FIG. 11, the image data denoted by label 1 are obtained from the source image 1, the image data denoted by label 2 are obtained from the source image 2, and the image data denoted by label 3 are obtained from the source image 3. As shown in the arrangement mode of three image data selected by rings in FIG. 11, the image data with three primary colors belonging to the same pixel in the same source image are distributed in three adjacent columns and in three adjacent rows of the three-dimensional image. Therefore, the sixth parameter can be configured for defining another basic data-arrangement variation, so that the image data obtained from different source images can be arranged according to the sixth parameter.

After Step S212 has been performed, the image data with three primary colors of the N source images can be obtained according to the first parameter, the second parameter, the third parameter, the fourth parameter, the fifth parameter and the sixth parameter, so as to form the three-dimensional image (as shown in Step S214).

From the above description, it can be seen that in the exemplary embodiment of the present invention, six parameters are firstly provided, wherein each of the six parameters is configured for defining a basic data-arrangement variation, and then the image data with three primary colors of the N source images are obtained according to the six parameters, so as to form a three-dimensional image. Therefore, the present invention only needs the six parameters to perform the synthesizing process on the N source images to form the data sequence of the three-dimensional image corresponding to the hardware standard of the three-dimensional television. In additional, although each of the N source images has the same image size as shown in the above description, the present invention is not limited herein.

The following will describe some exemplary embodiments of the arrangement mode of the image data of the three-dimensional image according to the six parameters.

Figure 12:
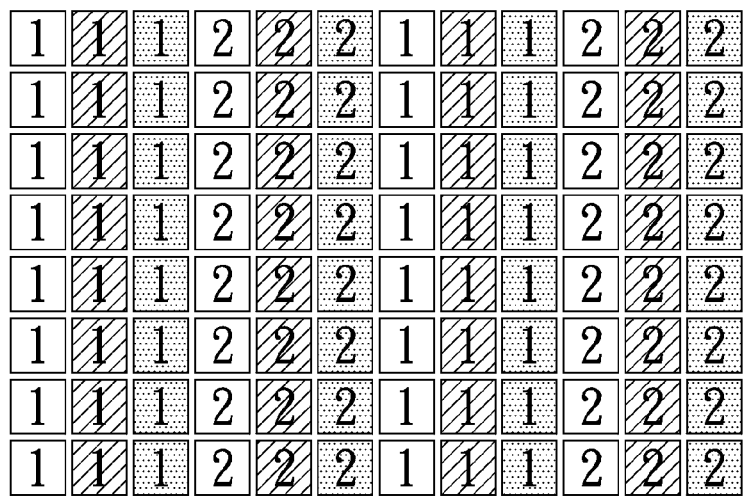
FIG. 12 is a schematic view for showing an arrangement mode of the image data of a three-dimensional image in accordance with a first exemplary embodiment of the present invention.

FIG. 12 is a schematic view for showing an arrangement mode of the image data of a three-dimensional image in accordance with a first exemplary embodiment of the present invention. The three-dimensional image as shown in FIG. 12 comprises the image data obtained from two source images (that is, N is two). The image data denoted by label 1 are obtained from the source image 1, and the image data denoted by label 2 are obtained from the source image 2. In addition, six parameters are shown below the three-dimensional image, wherein label "Pixel/Sub-Pixel" represents the first parameter, label "Views" represents the second parameter, label "Start View" represents the third parameter, label "Shift" represents the fourth parameter, label "Interval" represents the fifth parameter, and label "Multi Shift" represents the sixth parameter.

In the first exemplary embodiment as shown in FIG. 12, the first parameter Pixel/Sub-Pixel is set to "Pixel". That is, one of the pixels of the three-dimensional image which should be viewed by a user is formed by adjacent image data with three primary colors of the three-dimensional image. The second parameter Views is set to 2. The third parameter Start View is set to 1. That is, the image data disposed in the first column and the first row of the three-dimensional image is obtained from a source image 1 of the two source images. The fourth parameter Shift is set to zero. That is, the image data disposed in the same column of the three-dimensional image are obtained from the same source image. The fifth parameter Interval is set to zero for presenting the setting result of the fourth parameter. The sixth parameter Multi Shift is set to zero. That is, the image data with the three primary colors belonging to the same pixel in the same source image should not be distributed in three adjacent columns and in three adjacent rows of the three-dimensional image.

FIG. 13 is a schematic view for showing an arrangement mode of the image data of a three-dimensional image in accordance with a second exemplary embodiment of the present invention. Labels in FIG. 13 which are the same as those in FIG. 12 represent the same definitions. As shown in FIG. 13, the three-dimensional image comprises the image data obtained from two source images (that is, N is two).

In the second exemplary embodiment as shown in FIG. 13, the first parameter Pixel/Sub-Pixel is set to "Pixel". That is, one of the pixels of the three-dimensional image which should be viewed by a user is formed by adjacent image data with three primary colors of the three-dimensional image. The second parameter Views is set to 2. The third parameter Start View is set to 2. That is, the image data disposed in the first column and the first row of the three-dimensional image is obtained from a source image 2 of the two source images. The fourth parameter Shift is set to zero. That is, the image data disposed in the same column of the three-dimensional image are obtained from the same source image. The fifth parameter Interval is set to zero for presenting the setting result of the fourth parameter. The sixth parameter Multi Shift is set to zero. That is, the image data with three primary colors belonging to the same pixel in the same source image should not be distributed in three adjacent columns and in three adjacent rows of the three-dimensional image.

FIG. 14 is a schematic view for showing an arrangement mode of the image data of a three-dimensional image in accordance with a third exemplary embodiment of the present invention. Labels in FIG. 14 which are the same as those in FIG. 12 represent the same definitions. As shown in FIG. 14, the three-dimensional image comprises the image data obtained from two source images (that is, N is two).

In the third exemplary embodiment as shown in FIG. 14, the first parameter Pixel/Sub-Pixel is set to "Pixel". That is, one of the pixels of the three-dimensional image which should be viewed by a user is formed by adjacent image data with three primary colors of the three-dimensional image. The second parameter Views is set to 2. The third parameter Start View is set to 1. That is, the image data disposed in the first column and the first row of the three-dimensional image is obtained from a source image 1 of the two source images. The fourth parameter Shift is set to 3. That is, the image data disposed in the same column in the three-dimensional image are not obtained from the same source image. Furthermore, the fourth parameter Shift is also configured for setting a specific image data in a second specified row in the three-dimensional image should be shifted from the first column by three columns in right direction, wherein in the second specified row the specific image data is the first data obtained from the image source where the image data in the first column in a first specified row in the three-dimensional image belongs to. The fifth parameter Interval is set to 1 for presenting the setting result of the fourth parameter Shift. Furthermore, the fifth parameter Interval is also configured for setting that the first specified row should be shifted by one row in a vertical direction to reach the second specified row. The sixth parameter Multi Shift is configured for setting that the image data with three primary colors belonging to the same pixel in the same source image should not be distributed in three adjacent columns and in three adjacent rows of the three-dimensional image.

FIG. 15 is a schematic view for showing an arrangement mode of the image data of a three-dimensional image in accordance with a fourth exemplary embodiment of the present invention. Labels in FIG. 15 which are the same as those in FIG. 12 represent the same definitions. As shown in FIG. 15, the three-dimensional image comprises the image data obtained from two source images (that is, N is two).

In the fourth exemplary embodiment as shown in FIG. 15, the first parameter Pixel/Sub-Pixel is set to "Pixel". That is, one of the pixels of the three-dimensional image which should be viewed by a user is formed by adjacent image data with three primary colors of the three-dimensional image. The second parameter Views is set to 2. The third parameter Start View is set to 2. That is, the image data disposed in the first column and the first row of the three-dimensional image is obtained from a source image 2 of the two source images. The fourth parameter Shift is set to 3. That is, the image data disposed in the same column in the three-dimensional image are not obtained from the same source image. Furthermore, the fourth parameter Shift is also configured for setting a specific image data in a second specified row in the three-dimensional image should be shifted from the first column by three columns in right direction, wherein in the second specified row the specific image data is the first data obtained from the image source where the image data in the first column in a first specified row in the three-dimensional image belongs to. The fifth parameter Interval is set to one for presenting the setting result of the fourth parameter Shift. Furthermore, the fifth parameter Interval is also configured for setting that the first specified row should be shifted by one row in a vertical direction to reach the second specified row. The sixth parameter Multi Shift is set to zero. That is, the image data with three primary colors belonging to the same pixel in the same source image should not be distributed in three adjacent columns and in three adjacent rows of the three-dimensional image.

FIG. 16 is a schematic view for showing an arrangement mode of the image data of a three-dimensional image in accordance with a fifth exemplary embodiment of the present invention. Labels in FIG. 16 which are the same as those in FIG. 12 represent the same definitions. As shown in FIG. 16, the three-dimensional image comprises the image data obtained from two source images (that is, N is two).

In the fifth exemplary embodiment as shown in FIG. 16, the first parameter Pixel/Sub-Pixel is set to "Sub-Pixel". That is, one of the pixels of the three-dimensional image which should be viewed by a user is not formed by adjacent image data with three primary colors of the three-dimensional image. The second parameter Views is set to 2. The third parameter Start View is set to 2. That is, the image data disposed in the first column and the first row of the three-dimensional image is obtained from a source image 1 of the two source images. The fourth parameter Shift is set to zero. That is, the image data disposed in the same column in the three-dimensional image are obtained from the same source image. The fifth parameter Interval is set to zero for presenting the setting result of the fourth parameter Shift. The sixth parameter Multi Shift is set to zero. That is, the image data with three primary colors belonging to the same pixel in the same source image should not be distributed in three adjacent columns and in three adjacent rows of the three-dimensional image.

FIG. 17 is a schematic view for showing an arrangement mode of the image data of a three-dimensional image in accordance with a sixth exemplary embodiment of the present invention. Labels in FIG. 17 which are the same as those in FIG. 12 represent the same definitions. As shown in FIG. 17, the three-dimensional image comprises the image data obtained from two source images (that is, N is two).

In the sixth exemplary embodiment as shown in FIG. 17, the first parameter Pixel/Sub-Pixel is set to "Sub-Pixel". That is, one of the pixels of the three-dimensional image which should be viewed by a user is not formed by adjacent image data with three primary colors of the three-dimensional image. The second parameter Views is set to two. The third parameter Start View is set to two. That is, the image data disposed in the first column and the first row of the three-dimensional image is obtained from a source image 2 of the two source images. The fourth parameter Shift is set to zero. That is, the image data disposed in the same column in the three-dimensional image are obtained from the same source image. The fifth parameter Interval is set to zero for presenting the setting result of the fourth parameter Shift. The sixth parameter Multi Shift is set to zero. That is, the image data with three primary colors belonging to the same pixel in the same source image should not be distributed in three adjacent columns and in three adjacent rows of the three-dimensional image.

FIG. 18 is a schematic view for showing an arrangement mode of the image data of a three-dimensional image in accordance with a seventh exemplary embodiment of the present invention. Labels in FIG. 18 which are the same as those in FIG. 12 represent the same definitions. As shown in FIG. 18, the three-dimensional image comprises the image data obtained from two source images (that is, N is two).

In the seventh exemplary embodiment as shown in FIG. 18, the first parameter Pixel/Sub-Pixel is set to "Sub-Pixel". That is, one of the pixels of the three-dimensional image which should be viewed by a user is not formed by adjacent image data with three primary colors of the three-dimensional image. The second parameter Views is set to 2. The third parameter Start View is set to 1. That is, the image data disposed in the first column and the first row of the three-dimensional image is obtained from a source image 1 of the two source images. The fourth parameter Shift is set to 1. That is, the image data disposed in the same column in the three-dimensional image are not obtained from the same source image. Furthermore, the fourth parameter Shift is also configured for setting a specific image data in a second specified row in the three-dimensional image should be shifted from the first column by one column in right direction, wherein in the second specified row the specific image data is the first data obtained from the image source where the image data in the first column in a first specified row in the three-dimensional image belongs to. The fifth parameter Interval is set to 1 for presenting the setting result of the fourth parameter Shift. Furthermore, the fifth parameter Interval is also configured for setting that the first specified row should be shifted by one row in a vertical direction to reach the second specified row. The sixth parameter Multi Shift is set to zero. That is, the image data with three primary colors belonging to the same pixel in the same source image should not be distributed in three adjacent columns and in three adjacent rows of the three-dimensional image.

FIG. 19 is a schematic view for showing an arrangement mode of the image data of a three-dimensional image in accordance with an eighth exemplary embodiment of the present invention. Labels in FIG. 19 which are the same as those in FIG. 12 represent the same definitions. As shown in FIG. 19, the three-dimensional image comprises the image data obtained from two source images (that is, N is two).

In the eighth exemplary embodiment as shown in FIG. 19, the first parameter Pixel/Sub-Pixel is set to "Sub-Pixel". That is, one of the pixels of the three-dimensional image which should be viewed by a user is not formed by adjacent image data with three primary colors of the three-dimensional image. The second parameter Views is set to 2. The third parameter Start View is set to 2. That is, the image data disposed in the first column and the first row of the three-dimensional image is obtained from a source image 2 of the two source images. The fourth parameter Shift is set to 1. That is, the image data disposed in the same column in the three-dimensional image are not obtained from the same source image. Furthermore, the fourth parameter Shift is also configured for setting a specific image data in a second specified row in the three-dimensional image should be shifted from the first column by one column in right direction, wherein in the second specified row the specific image data is the first data obtained from the image source where the image data in the first column in a first specified row in the three-dimensional image belongs to. The fifth parameter Interval is set to 1 for presenting the setting result of the fourth parameter Shift. Furthermore, the fifth parameter Interval is also configured for setting that the first specified row should be shifted by one row in a vertical direction to reach the second specified row. The sixth parameter Multi Shift is set to zero. That is, the image data with three primary colors belonging to the same pixel in the same source image should not be distributed in three adjacent columns and in three adjacent rows of the three-dimensional image.

FIG. 20 is a schematic view for showing an arrangement mode of the image data of a three-dimensional image in accordance with a ninth exemplary embodiment of the present invention. Labels in FIG. 20 which are the same as those in FIG. 12 represent the same definitions. As shown in FIG. 20, the three-dimensional image comprises the image data obtained from five source images (that is, N is five).

In the ninth exemplary embodiment as shown in FIG. 20, the first parameter Pixel/Sub-Pixel is set to "Sub-Pixel". That is, one of the pixels of the three-dimensional image which should be viewed by a user is not formed by adjacent image data with three primary colors of the three-dimensional image. The second parameter Views is set to 5. The third parameter Start View is set to 1. That is, the image data disposed in the first column and the first row of the three-dimensional image is obtained from a source image 1 of the two source images. The fourth parameter Shift is set to 1. That is, the image data disposed in the same column in the three-dimensional image are not obtained from the same source image. Furthermore, the fourth parameter Shift is also configured for setting a specific image data in a second specified row in the three-dimensional image should be shifted from the first column by one column in right direction, wherein in the second specified row the specific image data is the first data obtained from the image source where the image data in the first column in a first specified row in the three-dimensional image belongs to. The fifth parameter Interval is set to 1 for presenting the setting result of the fourth parameter Shift. Furthermore, the fifth parameter Interval is also configured for setting that the first specified row should be shifted by one row in a vertical direction to reach the second specified row. The sixth parameter Multi Shift is set to 1. That is, the image data with three primary colors belonging to the same pixel in the same source image should be distributed in three adjacent columns and in three adjacent rows of the three-dimensional image.

Figures 21, 22:
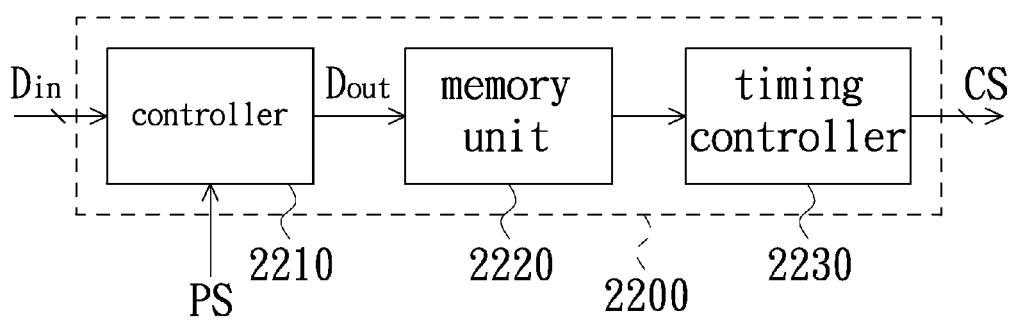
FIG. 21 is a schematic view for showing an arrangement mode of the image data of a three-dimensional image in accordance with a tenth exemplary embodiment of the present invention.
FIG. 22 is a schematic view of a three-dimensional image processing circuit in accordance with an exemplary embodiment of the present invention.

FIG. 21 is a schematic view for showing an arrangement mode of the image data of a three-dimensional image in accordance with a tenth exemplary embodiment of the present invention. Labels in FIG. 21 which are the same as those in FIG. 12 represent the same definitions. As shown in FIG. 21, the three-dimensional image comprises the image data obtained from five source images (that is, N is five).

In the tenth exemplary embodiment as shown in FIG. 21, the first parameter Pixel/Sub-Pixel is set to "Sub-Pixel". That is, one of the pixels of the three-dimensional image which should be viewed by a user is not formed by adjacent image data with three primary colors of the three-dimensional image. The second parameter Views is set to 5. The third parameter Start View is set to 1. That is, the image data disposed in the first column and the first row of the three-dimensional image is obtained from a source image 1 of the two source images. The fifth parameter Shift is set to zero. That is, the image data disposed in the same column in the three-dimensional image are obtained from the same source image. The fifth parameter Interval is set to zero for presenting the setting result of the fourth parameter Shift. The sixth parameter Multi Shift is set to zero. That is, the image data with three primary colors belonging to the same pixel in the same source image should not be distributed in three adjacent columns and in three adjacent rows of the three-dimensional image.

From the above description, a three-dimensional image processing circuit using the above three-dimensional image processing method can be provided accordingly.

FIG. 22 is a schematic view of a three-dimensional image processing circuit in accordance with an exemplary embodiment of the present invention. Referring to FIG. 22, the three-dimensional image processing circuit 2200 is configured for performing a synthesizing process on the image data (as marked by label Din) of N source images, and N is a natural number and is larger than or equal to two. Each of the N source images corresponds to a visual angle, and each of the N source images comprises image data with three primary colors. Furthermore, the image data of each of the N source images are arranged in an array according to a predetermined color sequence. The three-dimensional image processing circuit 2200 comprises a controller 2210, a memory unit 2220 and a timing controller 2230. The controller 2210 is configured for receiving the image data Din of the N source images and the six parameters (as marked by label PS) as shown in the above description and obtaining the image data with three primary colors of the N source images to generate and output a data sequence (as marked by Dout) of a three-dimensional image. The memory unit 2220 is electrically coupled to the controller 2210 for storing the output of the controller 2210. The timing controller 2230 is electrically coupled to the memory unit 2220 for accessing the memory unit 2220 and processing the data stored in the memory unit 2220 to generate corresponding control signals (as marked by label CS). The control signals are configured for controlling back-end circuits, so that the three-dimensional television can display a three-dimensional image corresponding.

FIG. 23 is a flow chart of a three-dimensional image processing method in accordance with another exemplary embodiment of the present invention. The three-dimensional image processing method is also configured for processing N source images, and N is a natural number and is larger than or equal to two. Each of the N source images corresponds to a visual angle, and each of the N source images comprises image data with three primary colors. Furthermore, the image data of each of the N source images are arranged in an array according to a predetermined color sequence. The three-dimensional image processing method comprises the following steps: defining a data-arrangement sub-array for a three-dimensional image (as shown in Step S2302). Each of the elements of the data-arrangement sub-array is configured for indicating that the image data with one primary color should be obtained from which one of the N source images. A data-arrangement array presented by the three-dimensional image can be divided into a plurality of data-arrangement sub-arrays which do not overlap with each other. The image data corresponding to the elements of the data-arrangement sub-array are arranged according to the predetermined color sequence, and the image sources indicated by the elements of the data-arrangement sub-array comprise the N source images. The Step S2302 will be described by FIG. 24.

Figure 24:
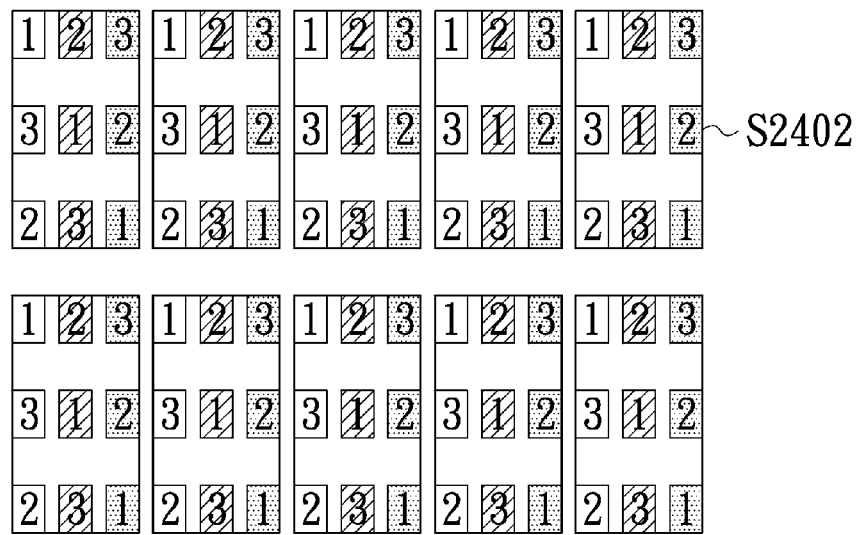
FIG. 24 is a schematic view for showing a data-arrangement array presented by a three-dimensional image, and the data-arrangement sub-arrays of the data-arrangement array.

FIG. 24 is a schematic view for showing a data-arrangement array presented by a three-dimensional image, and the data-arrangement sub-arrays of the data-arrangement array. As shown in FIG. 24, the three-dimensional image comprises the image data obtained from three source images (that is, N is three). The data-arrangement array presented by the three-dimensional image can be divided into a plurality of data-arrangement sub-arrays 2402 which do not overlap with each other, and each of the data-arrangement sub-arrays 2402 is an array of 3×3. Each of the elements of each of the data-arrangement sub-arrays 2402 is configured for indicating that the image data with one primary color should be obtained from which one of the N source images. In FIG. 24, the blank cells represent red image data, the cells with diagonal lines represent green image data, and the cells with dots represent blue image data. In addition, the image data corresponding to the elements of each of data-arrangement sub-arrays 2402 are arranged in the predetermined color sequence, and the image sources indicated by the elements of each of the data-arrangement sub-arrays 2402 comprise the three source images, which will be described later.

For any one of the data-arrangement sub-arrays 2402, the element disposed in the first row and the first column of any one of the data-arrangement sub-arrays 2402, the element disposed in the second row and the second column of any one of the data-arrangement sub-arrays 2402, and the element disposed in the third row and the third column of any one of the data-arrangement sub-arrays 2402 are configured for indicating that the corresponding image data should be obtained from a first source image of the three source images. The element disposed in the first row and the second column of any one of the data-arrangement sub-arrays 2402, the element disposed in the second row and the third column of any one of the data-arrangement sub-arrays 2402, and the element disposed in the third row and the first column of any one of the data-arrangement sub-arrays 2402 are configured for indicating that the corresponding image data should be obtained from a second source image of the three source images. The element disposed in the first row and the third column of any one of the data-arrangement sub-arrays 2402, the element disposed in the second row and the first column of any one of the data-arrangement sub-arrays 2402, and the element disposed in the third row and the second column of any one of the data-arrangement sub-arrays 2402 are configured for indicating that the corresponding image data should be obtained from a third source image of the three source images.

After Step S2302 has been performed, the image data with three primary colors of the N source images can be obtained according to the data-arrangement sub-array, so as to form the three-dimensional image (as shown in Step S2304).

From the above description, it can be seen that the present invention may only employ one data-arrangement sub-array to perform a synthesizing process on N source images, so as to form a data sequence of a three-dimensional image corresponding to the hardware standard of the three-dimensional television.

According to the above description as shown in FIGS. 23-24, the present invention further provides a three-dimensional image processing circuit using the three-dimensional image processing method as shown in FIGS. 23-24.

Figure 25:
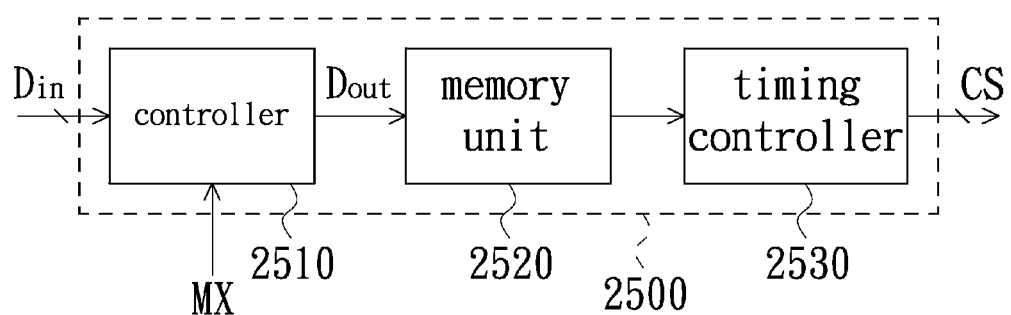
FIG. 25 is a schematic view of a three-dimensional image processing circuit in accordance with another exemplary embodiment of the present invention.

FIG. 25 is a schematic view of a three-dimensional image processing circuit in accordance with another exemplary embodiment of the present invention. Referring to FIG. 25, the three-dimensional image processing circuit 2500 is configured for performing a synthesizing process on image data (as marked by label Din) of N source images, and N is a natural number and is larger than or equal to two. Each of the N source images corresponds to a visual angle, and each of the N source images comprises image data with three primary colors. Furthermore, the image data of each of the N source images are arranged in an array according to a predetermined color sequence. The three-dimensional image processing circuit 2500 comprises a controller 2510, a memory unit 2520 and a timing controller 2530. The controller 2510 is configured for receiving the image data Din of the N source images and the information (as marked by label MX) of a data-arrangement sub-array of a three-dimensional image. And the controller 2510 is further configured for obtaining the image data with three primary colors of the N source images according to the data-arrangement sub-array, so as to form and output a data sequence (as marked by label Dout) of the three-dimensional image. The memory unit 2520 is electrically coupled to the controller 2510 for storing the output of the controller 2510. The timing controller 2530 is electrically coupled to the memory unit 2520 for accessing the memory unit 2220 and processing the data stored in the memory unit 2220, so as to generate corresponding control signals (as marked by label CS). The control signals are configured for controlling back-end circuits, so that the three-dimensional television can display a three-dimensional image corresponding.

In summary, in one method of the present invention for solving the above problem, six parameters are firstly provided, wherein each of the six parameters is configured for defining a basic data-arrangement variation, and then the image data with the three primary colors of the N source images are obtained according to the six parameters, so as to form a three-dimensional image. Therefore, the present invention may only employ the six parameters to perform the synthesizing process on the N source images, so as to form forming the data sequence of the three-dimensional image corresponding to the hardware standard of the three-dimensional television. In addition, in another method of the present invention for solving the above problem, a data-arrangement sub-array of a three-dimensional image is firstly defined. Wherein each of the elements of the data-arrangement sub-array is configured for indicating the image data with one primary color should be obtained from which one of the N source images. A data-arrangement array presented by the three-dimensional image can be divided into a plurality of data-arrangement sub-arrays which do not overlap with each other. Then, the image data with the three primary colors of the N source images are obtained according to the data-arrangement sub-array, so as to form the three-dimensional image. Therefore, the present invention may only employ one data-arrangement sub-array to perform the synthesizing process on the N source image, so as to form a data sequence of the three-dimensional image corresponding to the hardware standard of the three-dimensional television.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional image processing method configured for processing N source images, each of the source images corresponding to a visual angle, each of the source images comprising image data with three primary colors, the image data of each of the source images being arranged in an array according to a predetermined color sequence, N being a natural number and being larger than or equal to two, the three-dimensional image processing method comprising:

providing a first parameter, configured for setting whether one of the pixels of a three-dimensional image which should be viewed by a user is formed by adjacent image data with the three primary colors of the three-dimensional image, the image data of the three-dimensional image being arranged in an array according to the predetermined color sequence;

providing a second parameter, which being set to N;

providing a third parameter, configured for setting the image data which will be disposed at the position where the first row and the first column of the three-dimensional image intersect should be obtained from which one of the N source images;

providing a fourth parameter, configured for setting whether the image data which will be disposed in the same column of the three-dimensional image should be obtained from the same source image; if not, the fourth parameter being also configured for setting how many columns that a specific image data in a second specified row in the three-dimensional image should be shifted from the first column of the array in a predetermined direction, and in the second specified row the specific image data being the first data obtained from the image source where the image data in the first column in a first specified row in the three-dimensional image belongs to; the first specified row being a data row in which the image data are processed or have been just processed, and the second specified row being a data row after the first specified row;

providing a fifth parameter, configured for presenting a setting result of the fourth parameter, and the fifth parameter being further configured for setting how many rows that the first specified row should be shifted in a vertical direction to reach the second specified row when the fourth parameter sets that the image data which will be disposed in the same column do not need to be obtained from the same source image;

providing a sixth parameter, configured for setting whether the image data of three-dimensional primary colors belonging to the same pixel in the same source image should be distributed in three adjacent rows and in three adjacent columns of the three-dimensional image; and obtaining the image data with the three primary colors of the N source images according to the first parameter, the second parameter, the third parameter, the fourth parameter, the fifth parameter and the sixth parameter, so as to form the three-dimensional image.

2. The three-dimensional image processing method according to claim 1, wherein N is two, the first parameter sets that one of the pixels of the three-dimensional image which should be viewed by the user is formed by adjacent image data with the three primary colors of the three-dimensional image; the second parameter is set to two; the third parameter sets that the image data which will be disposed at the position where the first row and the first column of the three-dimensional image intersect should be obtained from a first source image of the two source images; the fourth parameter sets that the image data which will be disposed in the same column of the three-dimensional image should be obtained from the same source image; the fifth parameter presents the setting result of the fourth parameter; and the sixth parameter sets that the image data with the three primary colors belonging to the same pixel of the same source image should not be distributed in three adjacent rows and in three adjacent columns of the three-dimensional image.

3. A three-dimensional image processing circuit configured for processing N source images, each of the source images corresponding to a visual angle, each of the source images comprising image data with three primary colors, the image data of each of the source images being arranged in an array according to a predetermined color sequence, N being a natural number and being larger than or equal to two, the three-dimensional image processing circuit comprising:

a controller, configured for receiving image data of the N source images, a first parameter, a second parameter, a third parameter, a fourth parameter, a fifth parameter and a sixth parameter and obtaining the image data with the three primary colors of the N source images according to the first parameter, the second parameter, the third parameter, the fourth parameter, the fifth parameter and the sixth parameter, so as to form a data sequence of a three-dimensional image, wherein the first parameter is configured for setting whether one of the pixels of the three-dimensional image which should be viewed by a user is formed by adjacent image data with the three primary colors of the three-dimensional image, and the image data of the three-dimensional image are arranged in an array according to the predetermined color sequence; the second parameter is set to N; the third parameter is configured for setting the image data which will be disposed at the position where the first row and the first column of the three-dimensional image intersect should be obtained from which one of the N source images; the fourth parameter is configured for setting whether the image data which will be disposed in the same column of the three-dimensional image should be obtained from the same source image; if not, the fourth parameter is also configured for setting how many columns that a specific image data in a second specified row in the three-dimensional image should be shifted from the first column of the array in a predetermined direction, and in the second specified row the specific image data is the first data obtained from the image source where the image data in the first column in a first specified row in the three-dimensional image belongs to, the first specified row is a data row in which the image data are processed or have been just processed, and the second specified row is a data row after the first specified row; the fifth parameter is configured for presenting the setting result of the fourth parameter, furthermore, the fifth parameter is also configured for setting how many rows that the first specified row should be shifted in a vertical direction to reach the second specified row when the fourth parameter sets that the image data which will be disposed in the same column do not need to be obtained from the same source image; the sixth parameter is configured for setting whether the image data of three-dimensional primary colors belonging to the same pixel in the same source image should be distributed in three adjacent rows and in three adjacent columns of the three-dimensional image;

a memory unit, electrically coupled to the controller for storing the output of the controller; and a timing controller, electrically coupled to the memory unit for accessing the memory unit and processing the data stored in the memory unit.

4. The three-dimensional image processing circuit according to claim 3, wherein N is two, the first parameter sets that one of the pixels of the three-dimensional image which should be viewed by the user is formed by adjacent image data with the three primary colors of the three-dimensional image; the second parameter is set to two; the third parameter sets that the image data which will be disposed at the position where the first row and the first column of the three-dimensional image intersect should be obtained from a first source image of the two source images; the fourth parameter sets that the image data which will be disposed in the same column of the three-dimensional image should be obtained from the same source image; the fifth parameter presents the setting result of the fourth parameter; and the sixth parameter sets that the image data with the three primary colors belonging to the same pixel of the same source image should not be distributed in three adjacent rows and in three adjacent columns of the three-dimensional image.

5. A three-dimensional image processing method configured for processing N source images, each of the source images corresponding to a visual angle, each of the source images comprising image data with three primary colors, the image data of each of the source images being arranged in an array according to a predetermined color sequence, N being a natural number and being larger than or equal to two, the three-dimensional image processing method comprising:

defining a data-arrangement sub-array for a three-dimensional image, wherein each of the elements of the data-arrangement sub-array is configured for indicating that the image data with one primary color should be obtained from which one of the N source images, a data-arrangement array presented by the three-dimensional image can be divided into a plurality of data-arrangement sub-arrays which do not overlap with each other, the image data corresponding to the elements of the data-arrangement sub-array are arranged according to the predetermined color sequence, and the image sources indicated by the elements of the data-arrangement sub-array comprise the N source images; and obtaining the image data with the three primary colors of the N source images according to the data-arrangement sub-array, so as to form the three-dimensional image.

6. The three-dimensional processing method according to claim 5, wherein N is three, and the data-arrangement sub-array is an array of 3×3.

7. The three-dimensional processing method according to claim 6, wherein the element disposed in the first row and the first column in the data-arrangement sub-array, the element disposed in the second row and the second column in the data-arrangement sub-array and the element disposed in the third row and the third column in the data-arrangement sub-array are configured for indicating that the corresponding image data should be obtained from a first source image of the N source images; the element disposed in the first row and the second column in the data-arrangement sub-array, the element disposed in the second row and the third column in the data-arrangement sub-array and the element disposed in the third row and the first column in the data-arrangement sub-array are configured for indicating that the corresponding image data should be obtained from a second source image of the N source images; and the element disposed in the first row and the third column in the data-arrangement sub-array, the element disposed in the second row and the first column in the data-arrangement sub-array and the element disposed in the third row and the second column in the data-arrangement sub-array are configured for indicating that the corresponding image data should be obtained from a third source image of the N source images.

8. A three-dimensional image processing circuit configured for processing N source images, each of the source images corresponding to a visual angle, each of the source images comprising image data with three primary colors, the image data of each of the source images being arranged in an array according to a predetermined color sequence, N being a natural number and being larger than or equal to two, the three-dimensional image processing circuit comprising:

a controller, configured for receiving the image data of the N source images and the information of a data-arrangement sub-array of a three-dimensional image and for obtaining the image data with the three primary colors of the N source images according to the data-arrangement sub-array, so as to form a data sequence of the three-dimensional image to output, wherein each of the elements of the data-arrangement sub-array is configured for indicating that the image data with one primary color should be obtained from which one of the N source images, a data-arrangement array presented by the three-dimensional image can be divided into a plurality of data-arrangement sub-arrays which do not overlap with each other, the image data corresponding to the elements of the data-arrangement sub-array are arranged according to the predetermined color sequence, and the image sources indicated by the elements of the data-arrangement sub-array comprise the N source images;

a memory unit, electrically coupled to the controller for storing the output of the controller; and a timing controller, electrically coupled to the memory unit for accessing the memory unit and processing the data stored in the memory unit.

9. The three-dimensional image processing circuit according to claim 8, wherein N is three, and the data-arrangement sub-array is an array of 3×3.

10. The three-dimensional image processing circuit according to claim 9, wherein the element disposed in the first row and the first column in the data-arrangement sub-array, the element disposed in the second row and the second column in the data-arrangement sub-array and the element disposed in the third row and the third column in the data-arrangement sub-array are configured for indicating that the corresponding image data should be obtained from a first source image of the N source images; the element disposed in the first row and the second column in the data-arrangement sub-array, the element disposed in the second row and the third column in the data-arrangement sub-array and the element disposed in the third row and the first column in the data-arrangement sub-array are configured for indicating that the corresponding image data should be obtained from a second source image of the N source images; and the element disposed in the first row and the third column in the data-arrangement sub-array, the element disposed in the second row and the first column in the data-arrangement sub-array and the element disposed in the third row and the second column in the data-arrangement sub-array are configured for indicating that the corresponding image data should be obtained from a third source image of the N source images.

* * * * *